(12) United States Patent
Sanders et al.

(10) Patent No.: US 9,340,724 B2
(45) Date of Patent: May 17, 2016

(54) NONIONIC SURFACTANTS FOR ENHANCED CRUDE OIL RECOVERY

(71) Applicant: Dow Global Technologies LLC, Midland, MI (US)

(72) Inventors: Aaron W. Sanders, Missouri City, TX (US); Sayeed Abbas, Pearland, TX (US); Shawn Maynard, Angleton, TX (US); Matthew Miller, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/347,143

(22) PCT Filed: Sep. 20, 2012

(86) PCT No.: PCT/US2012/056283
§ 371 (c)(1),
(2) Date: Mar. 25, 2014

(87) PCT Pub. No.: WO2013/048860
PCT Pub. Date: Apr. 4, 2013

(65) Prior Publication Data
US 2014/0251607 A1    Sep. 11, 2014

Related U.S. Application Data

(60) Provisional application No. 61/539,795, filed on Sep. 27, 2011.

(51) Int. Cl.
*C09K 8/584* (2006.01)
*C09K 8/594* (2006.01)
*E21B 43/16* (2006.01)
*C08G 65/26* (2006.01)

(52) U.S. Cl.
CPC ............ *C09K 8/584* (2013.01); *C08G 65/2609* (2013.01); *C08G 65/2663* (2013.01); *C09K 8/594* (2013.01); *E21B 43/166* (2013.01)

(58) Field of Classification Search
USPC ........................................ 507/203; 166/270.2
See application file for complete search history.

(56) References Cited

U.S. PATENT DOCUMENTS

| 4,738,789 A | 4/1988 | Jones |
| 2004/0220430 A1 | 11/2004 | Eleveld et al. |
| 2005/0170991 A1 | 8/2005 | Ruland et al. |

(Continued)

FOREIGN PATENT DOCUMENTS

| WO | 2009000852 | 12/2008 | |
| WO | WO 2010/044818 A1 * | 4/2010 | ............. C08G 65/00 |

OTHER PUBLICATIONS

International Search Report and Written Opinion for related PCT Application PCT/US2012/056283, mailed Nov. 14, 2012 (14 pgs).

*Primary Examiner* — John J Figueroa
(74) *Attorney, Agent, or Firm* — Brooks, Cameron & Huebsch, PLLC

(57) ABSTRACT

The present disclosure provides methods of using a nonionic surfactant for enhanced oil recovery, where the nonionic surfactant is prepared with a double metal cyanide catalyst. The present disclosure also provides for an emulsion that includes carbon dioxide, a diluent and the nonionic surfactant.

5 Claims, 4 Drawing Sheets

(56) References Cited

U.S. PATENT DOCUMENTS

| | | |
|---|---|---|
| 2006/0224010 A1 | 10/2006 | Hinz et al. |
| 2011/0017462 A1* | 1/2011 | Raney et al. ................ 166/310 |
| 2011/0083846 A1 | 4/2011 | Bittner et al. |
| 2011/0198101 A1 | 8/2011 | Sanders et al. |
| 2012/0103635 A1 | 5/2012 | Sanders et al. |
| 2013/0068312 A1 | 3/2013 | Sanders |

* cited by examiner

NONIONIC SURFACTANTS FOR ENHANCED CRUDE OIL RECOVERY

This application is a National Stage Application under 35 U.S.C. §371 of International Application Number PCT/US2012/056283, filed Sept. 20, 2012 and published as WO 2013/048860 on Apr. 4, 2013, which claims the benefit to U.S. Provisional Application 61/539,795, filed Sep. 27, 2011, the entire contents of which are incorporated herein by reference in its entirety.

FIELD OF DISCLOSURE

Embodiments of the present disclosure are directed towards surfactants; more specifically, embodiments are directed towards nonionic surfactants that are soluble in carbon dioxide for enhanced crude oil recovery.

BACKGROUND

A variety of techniques have been used to enhance the recovery of hydrocarbons from subterranean formations in which the hydrocarbons no longer flow by natural forces. Such techniques can include water injection and/or subsequent miscible carbon dioxide flooding, among others. Water injection can be useful to recover some hydrocarbons, however, only about a third of the hydrocarbons are recovered using this technique. As such, typically water injection procedures are followed by an enhanced oil recovery technique such as miscible gas flooding. Miscible gas flooding can be performed with a carbon dioxide, to reduce the viscosity of the crude oil present in the subterranean formation in order to increase the flow of hydrocarbons to a production well. Carbon dioxide, which acts as a solvent to reduce the viscosity of the crude oil, is one of the most effective, and least expensive, miscible gases. During the miscible carbon dioxide flooding procedure the carbon dioxide is typically in the liquid and/or supercritical phase.

Miscible carbon dioxide flooding, however, can be accompanied with a number of drawbacks. One main problem encountered is poor sweep of the subterranean formation. Poor sweep occurs when the gas injected into the reservoir during a miscible carbon dioxide flooding process flows through the paths of least resistance due to the low viscosity of the gas, thus bypassing significant portions of the formation. When the gas bypasses significant portions of the formation, less crude oil is contacted with the gas, reducing the likelihood that the gas will reduce the viscosity of the crude oil. Thus, the gas injected during the miscible carbon dioxide flooding process is meant to "sweep" the crude oil toward the production well by lowering the viscosity of the crude oil. However, when the gas does not contact a large portion of the crude oil contained in the subterranean formation, a large portion of the crude oil in the subterranean formation is left behind, producing poor sweep. In addition, due to the low density of the gas, the injected gas can rise to the top of the formation and "override" portions of the formation, leading to early breakthrough of the gas at the production well, leaving less gas within the subterranean formation to contact with the crude oil, again reducing the likelihood that the gas will reduce the viscosity of the crude oil.

To enhance the effectiveness of the miscible carbon dioxide flooding process it has been suggested that a foaming agent or a surfactant be included in the process to help to generate a foam in the formation. A foam can generate an apparent viscosity of 100 to 1,000 times that of the injected gas, therefore, the foam can inhibit the flow of the gas into that portion of the subterranean formation that has previously been swept. In other words, the foam can serve to block the volumes of the subterranean formation through which the gas can short-cut, thereby reducing its tendency to channel through highly permeable fissures, cracks, or strata, and directing it toward previously unswept portions of the subterranean formation. As such, the foam can force the gas to drive the recoverable hydrocarbons from the less depleted portions of the reservoir toward the production well.

The surfactants used in creating foams for miscible carbon dioxide flooding processes, however, have suffered from a number of drawbacks. For example, traditional surfactants, such as ethoxy-sulfates, can create emulsions of oil and water which are difficult to break. The emulsions can cause permanent damage to the formation by irreversibly plugging pore throats. Further, these emulsions when produced may be difficult to separate or "break" and may necessitate costly solutions to remedy. Another problem encountered by prior art surfactants has been the selection of anionic surfactants that have a high affinity to formation rock within the reservoir, for example, carbonate. Surfactants with a high affinity to formation rock can adsorb into the formation rock, leading to surfactant loss. Without the surfactant present, there is less likelihood of forming foam within the reservoir, also leading to early breakthrough and poor sweep, as discussed herein.

SUMMARY

Embodiments of the present disclosure include a nonionic surfactant, a method of forming the nonionic surfactant and a method for recovering crude oil from a subterranean formation with the nonionic surfactant of the present disclosure.

The present disclosure provides for, among other things, a method for recovering crude oil from a subterranean formation that is penetrated by at least one injection well and one production well, that includes injecting a nonionic surfactant in carbon dioxide into the subterranean formation, where the nonionic surfactant is prepared by an alkoxylation reaction with a double metal cyanide catalyst of a first epoxide, a second epoxide different than the first epoxide, and a branched aliphatic alcohol having 3 to 9 carbon atoms; and recovering crude oil from the subterranean formation from a production well. Injecting the nonionic surfactant can include creating a foam with the nonionic surfactant in carbon dioxide and a diluent; and injecting the foam of the nonionic surfactant in carbon dioxide and the diluent into the subterranean formation.

The nonionic surfactant can have a polydispersity of 1.01 to 1.10. The branched aliphatic alcohol can have 6 to 8 carbon atoms. The first epoxide can be selected from the group consisting of propylene oxide, butylene oxide, hexene oxide, octene oxide, and combinations thereof. The second epoxide can be ethylene oxide. In one embodiment, the first epoxide is propylene oxide and the second epoxide is ethylene oxide, and a first stage of the alkoxylation reaction adds the propylene oxide to the branched aliphatic alcohol and a second stage of the alkoxylation reaction adds the ethylene oxide to provide the nonionic surfactant.

The nonionic surfactant can have propylene oxide as the first epoxide, where the alkoxylation reaction can have a molar ratio in a range of 1.5 to 10 moles of propylene oxide per mole of branched aliphatic alcohol. The nonionic surfactant of the present disclosure can have ethylene oxide as the second epoxide, where the alkoxylation reaction has a molar ratio in a range of 1.5 to 40 moles of ethylene oxide per mole of branched aliphatic alcohol.

The nonionic surfactant of the present disclosure can be used as part of a foam for use in enhanced crude oil recovery. An example of such a foam includes the nonionic surfactant, carbon dioxide in a liquid or supercritical phase, and a diluent, where the nonionic surfactant promotes a formation of the foam formed of carbon dioxide and the diluent.

The present disclosure also includes a method of using a nonionic surfactant prepared with a double metal cyanide catalyst for use in enhanced oil recovery, where the method includes providing the nonionic surfactant prepared by an alkoxylation reaction with the double metal cyanide catalyst of a first epoxide, a second epoxide different than the first epoxide, and a branched aliphatic alcohol having 3 to 9 carbon atoms; and injecting the nonionic surfactant into a subterranean formation during an enhanced oil recovery operation.

The above summary of the present disclosure is not intended to describe each disclosed embodiment or every implementation of the present disclosure. The description that follows more particularly exemplifies illustrative embodiments. In several places throughout the application, guidance is provided through lists of examples, and which examples can be used in various combinations. In each instance, the recited list serves only as a representative group and should not be interpreted as an exclusive list.

DEFINITIONS

As used herein, "an," "the," "at least one," and "one or more" are used interchangeably. The terms "comprises," "includes" and variations of these words do not have a limiting meaning where these terms appear in the description and claims. Thus, for example, a foam that comprises "a" nonionic surfactant can be interpreted to mean a foam that includes "one or more" nonionic surfactants. In addition, the term "comprising," which is synonymous with "including" or "containing," is inclusive, open-ended, and does not exclude additional unrecited elements or method steps.

As used herein, the term "and/or" means one, more than one, or all of the listed elements.

Also herein, the recitations of numerical ranges by endpoints include all numbers subsumed within that range (e.g., 1 to 5 includes 1, 1.5, 2, 2.75, 3, 3.80, 4, 5, etc.).

As used herein, the term "diluent" can include, for example, water, brine, connate water, surface water, distilled water, carbonated water, sea water and combinations thereof. For brevity, the word "diluent" will be used herein, where it is understood that one or more of "water," "brine," "connate water," "surface water," "distilled water," "carbonated water," and/or "sea water" can be used interchangeably.

As used herein, a "surfactant" refers to a chemical compound that lowers the interfacial tension between two liquids.

As used herein, a "dispersion" refers to a system in which particles of any nature (e.g. solid, liquid or gas) are dispersed in a continuous phase of a different composition (or state). Examples of a dispersion can include an emulsion and a foam.

As used herein, an "emulsion" refers to a mixture of two immiscible liquids, where one liquid (the dispersed phase) is dispersed in the other (the continuous phase).

As used herein, a "foam" refers to a dispersion of a gas, liquid, or supercritical fluid (where the phase may change depending on the conditions in the process) in a liquid.

As used herein, a "nonionic surfactant" refers to a surfactant where the molecules forming the surfactant are uncharged.

As used herein, "crude oil" refers to a naturally occurring, inflammable liquid consisting of a complex mixture of hydrocarbons of various molecular weights and other liquid organic compounds that are found in subterranean formations beneath the Earth's surface.

As used herein, a "supercritical phase" means a dense gas that is maintained above its critical temperature (the temperature above which it cannot be liquefied by pressure).

As used herein, a "cloud point" of a solution that includes the nonionic surfactant of the present disclosure is the temperature at which the nonionic surfactant is no longer completely soluble, precipitating as a second phase giving the solution a cloudy appearance.

DETAILED DESCRIPTION

Figure 1:
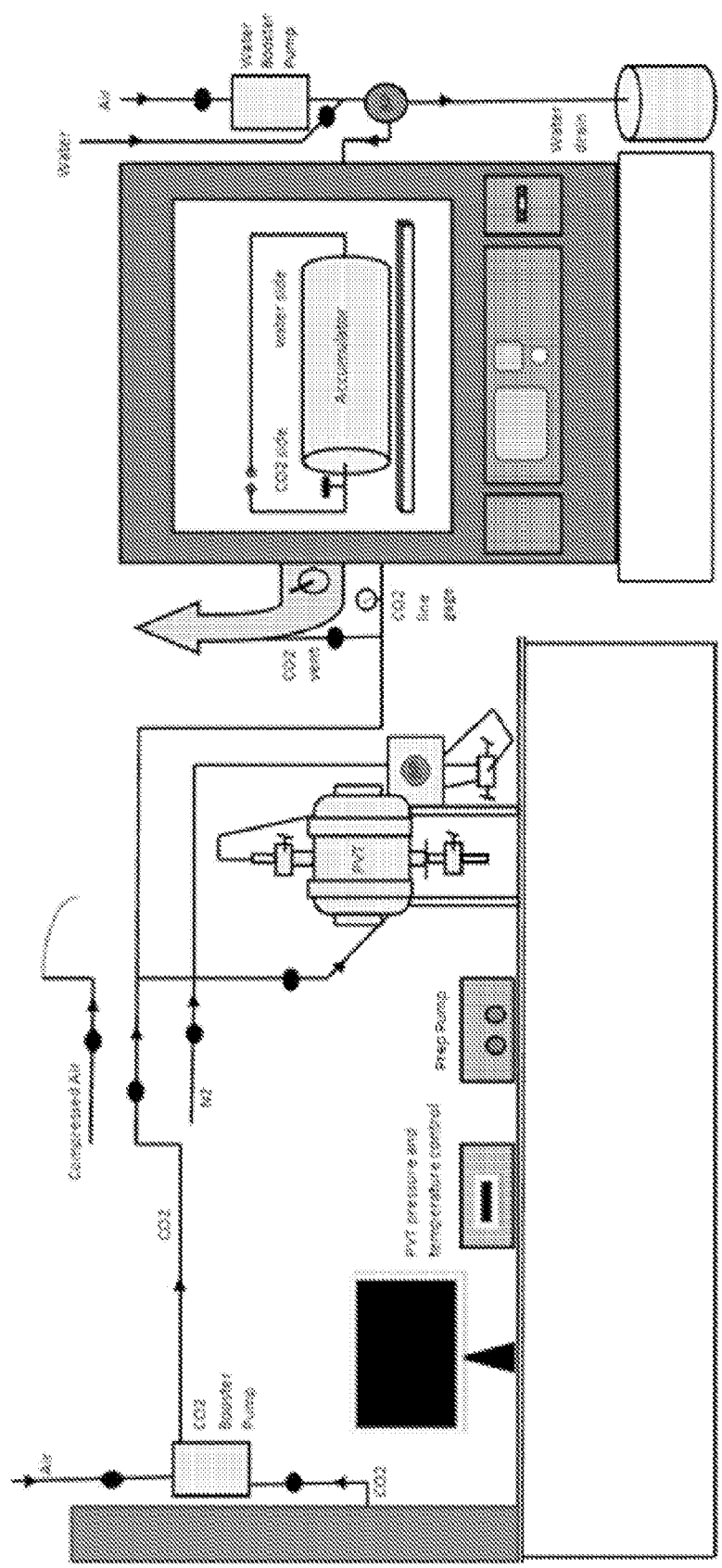
FIG. 1 provides a schematic of a Pressure-Volume-Temperature cell with an accumulator system for measuring cloud point values according to the present disclosure.

Embodiments of the present disclosure include a nonionic surfactant for enhanced crude oil recovery, the nonionic surfactant being prepared by an alkoxylation reaction with a double metal cyanide catalyst of a first epoxide, a second epoxide different than the first epoxide, and a branched aliphatic alcohol having 3 to 9 carbon atoms. The nonionic surfactant can be used as part of a foam for enhanced crude oil recovery. The foam can include the nonionic surfactant, carbon dioxide ($CO_2$) in a liquid or supercritical phase, and a diluent, where the nonionic surfactant promotes a formation of the foam of the carbon dioxide, the diluent and the nonionic surfactant.

Carbon dioxide is a poor solvent and, in general, only expensive nonionic surfactants containing such elements as fluorine and/or silicon are soluble in it. Unlike these expensive nonionic surfactants, the nonionic surfactant of the present disclosure is formed with a double metal cyanide (DMC) catalyst that allows for a nonionic surfactant that is soluble in carbon dioxide at temperatures and pressure that are typically found in subterranean formations undergoing enhanced crude oil recovery. Examples of such temperatures and pressures for subterranean formations include temperatures of 40 to 110° C. and pressures of 8300 (1200 pounds per square inch (psi)) to 55000 (8000 psi) KPa. Surprisingly, the nonionic surfactants used in the present disclosure can remain soluble in carbon dioxide at these lower pressures (e.g., 8300 kPa), which allows for their use in shallower subterranean formations. In addition, the improved carbon dioxide solubility of the nonionic surfactants used in the present disclosure allows the nonionic surfactant to remain in the carbon dioxide phase longer, thereby allowing the nonionic surfactant to travel deeper into the subterranean formation.

For the various embodiments, carbon dioxide used in enhanced crude oil recovery can be in a liquid, a gas or supercritical phase. As appreciated by one skilled in the art, carbon dioxide is in a liquid phase when subjected to a pressure of 1072 pounds per square inch (psi) and a temperature below 31 degrees Celsius (° C.). In addition, the carbon dioxide can transition to a supercritical phase when, at a pressure of 1072 psi, the temperature rises above 31° C. In embodiments of the present disclosure, the carbon dioxide injected into the subterranean formation can be transferred through a pipeline where the pressure is 1400 psi to 3500 psi and temperature ranges from 25 to 90° C.

So, it is appreciated that the carbon dioxide used in enhanced crude oil recovery processes may vacillate between one or more of a liquid phase or a supercritical phase. As such, the nonionic surfactant, the diluent and the carbon dioxide form what can broadly be called a dispersion, which can encompass both a foam and/or an emulsion. For ease of reading, the term "foam" will be used in the present disclosure for consistency, but it is understood that at various points during its use the carbon dioxide can be in different phases (e.g., liquid, gas, supercritical), therefore, the exact form of the dispersion formed with the nonionic surfactant, the diluent and the carbon dioxide could be as a foam or could be as an emulsion or something in between.

As discussed herein, an issue in enhanced crude oil recovery is that carbon dioxide injected directly into an underground formation has a low viscosity, as a result of which it channels through high permeability zones in an oil reservoir and leaves much of the oil behind. So, instead of spreading out through the underground formation, the carbon dioxide finds the fastest way through the formation. If, however, the carbon dioxide were made to behave in a more viscous manner, it could be made to spread out and slow down thereby contacting more of the underground formation. This would lead to more contact of the carbon dioxide with the crude oil in the underground formation.

To address this problem, the nonionic surfactant of the present disclosure helps to form a foam of carbon dioxide and the diluent. The structure of the nonionic surfactant helps to lower the interfacial tension between the carbon dioxide and the diluent, which helps in creating the foam. When formed in the underground formation, the foam helps to increase the residence time of the carbon dioxide and to spread the carbon dioxide through the underground formation. Once in contact with the crude oil, the carbon dioxide can absorb into the crude oil making it less viscous, among other desirable properties.

For creating foams for conformance and mobility control in enhanced oil recovery operations, it has been determined that it is preferable in some instances to inject the surfactant dissolved in the carbon dioxide. The nonionic surfactants of the present disclosure display a solubility in carbon dioxide at the temperatures and pressures typically found in subterranean formations undergoing enhanced crude oil recovery. Surprisingly, nonionic surfactants of the present disclosure prepared with a DMC catalyst, as compared to a potassium hydroxide catalyst, provide for a significant difference in carbon dioxide solubility. Specifically, a correlation of the catalyst used to prepare the nonionic surfactants of the present disclosure and their solubility in carbon dioxide ($CO_2$) has been found.

The nonionic surfactant of the present disclosure is prepared by an alkoxylation reaction with a DMC catalyst of a first epoxide, a second epoxide different than the first epoxide, and a branched aliphatic alcohol having 3 to 9 carbon atoms. As discussed herein, embodiments of the present disclosure utilize an aliphatic branched alcohol. Preferably the aliphatic branched alcohol is acyclic and a monohydric primary alcohol. Preferably, the aliphatic branched alcohol has 3 to 9 carbon atoms, and more preferably 6 to 8 carbon atoms. Using a mixture of the aliphatic branched alcohols to create the nonionic surfactants of the present disclosure is also possible. The choice of the number of carbon atoms used in the branched structure can be selected based on the end use of the foam, especially the temperature and/or pressure of the subterranean formation in which the foam will be used.

For the various embodiments, providing the nonionic surfactant can include an alkoxylation reaction having a first stage and a second stage. The first stage includes alkoxylating the alcohol of the aliphatic branched alcohol with the first epoxide to provide an intermediate compound. The second stage includes alkoxylating the intermediate compound with the second epoxide, different than the first epoxide, to form the nonionic surfactant. So, for example, in the first stage of the alkoxylation reaction the first epoxide can be added to the alcohol of the aliphatic branched alcohol in a blockwise fashion (as compared to a random fashion), followed by a blockwise addition of the second epoxide. In other words, alkoxylating the alcohol of the aliphatic branched alcohol with the first epoxide forms a first homopolymer subunit (e.g., a first block) covalently attached to the aliphatic branched alcohol. This intermediate compound can then be alkoxylated with the second epoxide (a different epoxide structure than the first epoxide) to form a second homopolymer subunit (e.g., a second block) on the intermediate compound thereby forming the nonionic surfactant of the present disclosure.

The alkoxylation reaction uses a DMC catalyst in both the first stage and the second stage of the alkoxylation reaction to produce the nonionic surfactant used in the present disclosure. A variety of DMC catalysts can be used in the alkoxylation reactions. For example, suitable DMC catalysts can be prepared by reacting aqueous solutions of metal salts and metal cyanide salts or metal cyanide complex acids to form the DMC catalyst as a precipitate.

Examples of suitable DMC catalysts for the alkoxylation reaction of the present disclosure can be found, for example, in U.S. Pat. Pubs. 2011/0083846 and 2005/0170991, among others, which are both incorporated herein by reference. Specific examples of suitable DMC catalysts include, but are not limited to, ARCOL Catalyst 3, a DMC catalyst available from Bayer Material Science AG (Leverkusen, Del.). For carrying out the reaction, the DMC catalyst can be added to the branched alcohol. By means of reduced pressure (for example <100 mbar) and/or by increasing the temperature (30 to 150° C.), water still present in the mixture can be removed. Thereafter, inert conditions are established with inert gas (e.g. nitrogen) and the first epoxide and then the second epoxide are added in stages, as discussed herein, at temperatures of from 60 to 180° C. Usually, 250 ppm to 1000 ppm of catalyst, based on the mixture, is used for the alkoxylation reaction. Reaction times for each step of the alkoxylation reaction can depend upon the degree of alkoxylation desired as well as upon the rate of the alkoxylation reaction (which is, in turn, dependent upon temperature, pressure, catalyst quantity and nature of the reactants).

In the first stage of the alkoxylation reaction, the aliphatic branched alcohol and the DMC catalyst are introduced into a reactor system and reacted under inert conditions (e.g., a nitrogen atmosphere). The alcohol on the aliphatic branched alcohol reacts with the first epoxide to form an intermediate compound. The second epoxide is added to the reactor system during the second stage of the alkoxylation reaction, where the second epoxide, different than the first epoxide, reacts with the intermediate compound in the presence of the catalyst and under the inert conditions to form the nonionic surfactant. The same DMC catalyst can be present in each of the alkoxylation reactions. If desired, additional catalyst can be added during the alkoxylation reaction.

For the present disclosure, the first epoxide is selected from the group consisting of propylene oxide, butylene oxide, hexene oxide, octene oxide and combinations thereof. The second epoxide can be ethylene oxide. As discussed, the second epoxide is different than the first epoxide in forming the nonionic surfactant of the present disclosure. So, for example, when the first epoxide is propylene oxide, the second epoxide cannot also be propylene oxide.

In a preferred embodiment, the first epoxide is propylene oxide and the second epoxide is ethylene oxide. For this embodiment, the first stage of the alkoxylation reaction adds the propylene oxide to the branched aliphatic alcohol and the second stage of the alkoxylation reaction adds the ethylene oxide to provide the nonionic surfactant. For example, during the first stage when the first epoxide is propylene oxide the alkoxylation reaction can have a molar ratio in a range of 1.5 to 10 moles of propylene oxide per mole of branched aliphatic alcohol. Preferably, during the first stage when the first epoxide is propylene oxide the alkoxylation reaction can have a molar ratio of propylene oxide to the branched aliphatic alcohol in a range of 3:1.0 moles to 7:1.0 moles. During the second stage when the second epoxide is ethylene oxide the alkoxylation reaction has a molar ratio in a range of 1.5 to 40 moles of ethylene oxide per mole of branched aliphatic alcohol. Preferably, during the second stage when the second epoxide is ethylene oxide the alkoxylation reaction has a molar ratio in a range of 7 to 16 moles of ethylene oxide per mole of branched aliphatic alcohol. Specific examples of this second stage of the alkoxylation reaction include using a molar ratio of ethylene oxide to branched aliphatic alcohol of 9:1 moles or using a molar ratio of ethylene oxide to branched aliphatic alcohol of 14:1 moles.

The nonionic surfactant of the present disclosure provides a water soluble component and a carbon dioxide soluble (water insoluble) component. While not wishing to be bound by theory, it is believed that the propylene oxide used in forming the nonionic surfactant, along with the branched aliphatic alcohol, provides the carbon dioxide soluble (water insoluble) component of the nonionic surfactant, while the ethylene oxide used in forming the nonionic surfactant provides the water soluble component of the nonionic surfactant. To modify the carbon dioxide and/or the water soluble portions, changes in the molar amount of the propylene oxide and ethylene oxide used in the nonionic surfactant and/or the low molecular weight branched aliphatic alcohol used can be made.

For the surfactant to be soluble in carbon dioxide it is preferred that the aliphatic alcohol be branched, where being branched means the presence of at least one branch (i.e., an oligomeric offshoot from a main chain) in the alkyl chain. While not wishing to be bound by theory, the presence of the branch in the alkyl chain is believed to lower the interaction of the nonionic surfactants with each other (e.g., preventing them from packing together) and thereby allowing stronger solvation of the surfactant by $CO_2$ molecules.

In addition, the alkoxylation reaction using the DMC catalyst provides the nonionic surfactant used in the present disclosure with a narrow polydispersity range. For the various embodiments, the nonionic surfactant used in the present disclosure can have a polydispersity of 1.01 to 1.10. The polydispersity can be determined by means of methods known to persons skilled in the art, for example by means of gel chromatography (size exclusion).

For the various embodiments, the nonionic surfactant of the present disclosure can have a cloud point in a range of the temperature of the subterranean formation to 30° C. above a temperature of the subterranean formation in which the foam is to be used. In some embodiments, selecting the nonionic surfactant of the present disclosure includes selecting the surfactant with a cloud point in a range of 10 to 20° C. above the temperature of the subterranean formation in which the foam is to be used.

Embodiments of the present disclosure include a method for recovering crude oil from a subterranean formation penetrated by at least one injection well and one production well. For the various embodiments, the method includes providing the nonionic surfactant and injecting the nonionic surfactant in the carbon dioxide into the subterranean formation via the injection well. For example, the diluent can be injected into the formation followed by injection of the nonionic surfactant with the carbon dioxide via the injection well to generate the foam.

In an alternative example, it is also possible to inject the nonionic surfactant with the diluent into the subterranean formation via the injection well followed by injecting the carbon dioxide into the subterranean formation (i.e., the carbon dioxide is injected after the nonionic surfactant with the diluent is injected into the subterranean formation) to generate the foam. In addition, in some embodiments, the nonionic surfactant can be injected into the reservoir with both the diluent and carbon dioxide to generate the foam, where the nonionic surfactant can be included in either the carbon dioxide and/or the diluent. The foam can also be created before being injected into the subterranean formation by stirring the diluent and the nonionic surfactant and injecting it into the subterranean reservoir. Other methods of forming foam within a subterranean formation are described in U.S. Pat. No. 4,380,266, which is incorporated herein by reference.

For the various embodiments, the nonionic surfactant, as described herein, can be included in an amount of at least 0.01 weight percent when dissolved directly in the carbon dioxide phase based on the weight of the carbon dioxide. In an additional embodiment, the nonionic surfactant of the present disclosure can be present in an amount of at least 0.05 weight percent when dissolved directly in the carbon dioxide phase based on the weight of the carbon dioxide. In another embodiment, the nonionic surfactant can be present in an amount of at least 0.5 weight percent when dissolved directly in the diluent phase based on the weight of the diluent. In an additional embodiment, the nonionic surfactant can be present in an amount of at least 1.0 weight percent when dissolved directly in the diluent phase based on the weight of the diluent. In addition, the nonionic surfactant can be included in the foam of the present disclosure in a range of 0.03 to 5.0 weight percent based on the total weight of the composition used to create the foam. In another embodiment, the nonionic surfactant can be included in the compositions of the present disclosure in a range of 0.05 to 2.0 weight percent based on the total weight of the composition used to create the foam. Other ranges are possible.

The carbon dioxide is a noncondensable gas (e.g., a gas that is not easily condensed by cooling) in the foam. As appreciated by one skilled in the art, for a given crude oil temperature, the noncondensable gas can become miscible with crude oil above a pressure known as the minimum miscibility pressure. Above this pressure, this "noncondensable" gas can attain a liquid phase or supercritical phase that has the characteristics of both gases and liquids. With enhanced recovery processes which employ noncondensable gases under miscible conditions the crude oil can be caused to flow toward a producing well because the noncondensable gas acts as a solvent, thus substantially dissolving, or "swelling" the crude oil (e.g., increases the volume of the crude oil by dissolving into the crude oil) to reduce the viscosity of the crude oil (e.g., provide a lowered viscosity of the crude oil). As used herein "dissolving" into the crude oil refers to the process where the carbon dioxide in the foam passes into solution with the crude oil. Since the carbon dioxide has a low viscosity relative to the crude oil, the viscosity of the crude oil will decrease as the carbon dioxide dissolves into the crude oil. In addition, viscosity is a measure of a fluid's resistance to flow. Therefore, by allowing the carbon dioxide in the foam to dissolve into the crude oil in the subterranean formation to provide a lowered viscosity of the crude oil, the crude oil will flow more readily than if the carbon dioxide had not dissolved into the crude oil. By reducing the viscosity, the crude oil can flow into a production well linked to the subterranean formation for recovery of the crude oil. In other words, the crude oil, having the lowered viscosity, can be recovered from the subterranean formation from the production well.

Although embodiments described herein include carbon dioxide as the noncondensable gas in compositions of the present disclosure, one skilled in the art will appreciate that other noncondensable gases may also be included in place of carbon dioxide and/or in addition to carbon dioxide. Examples of other possible noncondensable gases include, but are not limited to, nitrogen, natural gas, methane, propane, butane, ethane, ethylene, hydrogen sulfide, carbonyl sulfide, air, combustion flue gas, mixtures of methane with ethane, argon, light hydrocarbons, and mixtures thereof, among others.

The method for recovering crude oil from a subterranean formation can also include injecting a drive fluid into the subterranean formation after injection of the carbon dioxide and diluent to form the foam in the subterranean formation. As used herein, the term "drive fluid" can include a liquid, a gas, a dispersion or a mixture thereof, which is used in enhanced crude oil recovery. Examples of a drive fluid can include, but are not limited to, water, brine, an aqueous solution containing a polymer, a dispersion, a foam, an emulsion and mixtures thereof. Additional examples of the drive fluid can include a gas or a vapor selected from carbon dioxide, $H_2S$, steam, a hydrocarbon-containing gas, an inert gas, air, oxygen and mixtures thereof. Further it is understood that the surfactant can be injected intermittently or using gradients in concentration, which may help to lower the effective cost of the application.

In some embodiments, compositions of the present disclosure can include other additives. For example, the composition can include corrosion inhibitors, antioxidants, co-surfactants, scale inhibitors, mixtures thereof, as well as other additives. In some embodiments, the total amount of the additives added to the compositions of the present disclosure is not greater than about 5 weight percent, based on a total weight of the composition.

In addition to being used in enhanced crude oil recovery, the nonionic surfactants of the present disclosure may also be used in a variety of other areas where it would be desirable to use carbon dioxide as a solvent in a foam or an emulsion. Such areas include, but are not limited to, dry cleaning applications and industrial catalysis. In dry cleaning applications, the nonionic surfactant can help form an emulsion of water and supercritical carbon dioxide, which can act as a cleaning solvent. In industrial catalysis, an emulsion or a foam of the nonionic surfactant, supercritical carbon dioxide and a diluent may act as a solvent for the catalyst system, which normally would have required an organic solvent.

It is to be understood that the above description has been made in an illustrative fashion, and not a restrictive one. Although specific embodiments have been illustrated and described herein, those of ordinary skill in the art will appreciate that other component arrangements can be substituted for the specific embodiments shown. The claims are intended to cover such adaptations or variations of various embodiments of the disclosure, except to the extent limited by the prior art.

In the foregoing Detailed Description, various features are grouped together in exemplary embodiments for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the disclosure.

Embodiments of the present disclosure are illustrated by the following examples. It is to be understood that the particular examples, materials, amounts, and procedures are to be interpreted broadly in accordance with the scope and spirit of the disclosure as set forth herein.

EXAMPLES

The following examples are given to illustrate, but not limit, the scope of this disclosure. Unless otherwise specified, all instruments and chemicals used are commercially available.

Materials
Propylene Oxide (PO, The Dow Chemical Company)
Potassium hydroxide pellets (KOH, ACROS)
Sodium hydroxide (1 N NaOH, Fisher Scientific)
2-ethyl-1-hexanol (Sigma-Aldrich®, St. Louis, Mo.)
ARCOL Catalyst 3, Double Metal Cyanide catalyst (DMC catalyst) (Bayer Material Science AG, Leverkusen, Del.).
Ethylene Oxide (EO, The Dow Chemical Company)
Magnesol®XL (Magnesium Silicate, The Dallas Group of America)
Hydranal® Composite 5 reagent (Fluka)
Deionized (DI) water is used throughout from a Nanopure™ II (Barnstead, Dubuque, IA) with an average conductance of 16 ohms.
Phthalic anhydride (J T Baker)
imidazole catalyst (Acros)
pyridine solvent (Fisher Scientific)
Nitrogen (Instrument-grade nitrogen (>99.99% pure, Praxair Distribution, Inc.)

Nonionic Surfactant Synthesis

The following procedure exemplifies a standard procedure for synthesizing the nonionic surfactants of the present disclosure prepared by an alkoxylation reaction with a double metal cyanide catalyst of a first epoxide, a second epoxide different than the first epoxide, and a branched aliphatic alcohol having 3 to 9 carbon atoms. One skilled in the art will appreciate that this is an exemplary procedure and that other branched aliphatic alcohol and/or different amounts of the first epoxide and the second epoxide can be used in the procedure to make the nonionic surfactant of the present disclosure.

Size Exclusion Chromatography (SEC) Procedure

SEC experiments were performed identically for all samples. All samples were injected in duplicate to determine the standard deviation of the measurement. The analysis conditions are given below:

Columns: A series of four Polymer Labs columns of the following sizes 50 Å+100 Å+1000 Å+10000 Å are used, where all columns are 7.5×300 mm. The 50 Å column is part number PL1110-6515; the 100 Å column is part number PL1110-6520; the 1000 Å column is part number PL1110-6530 and the 10000 Å column is part number PL1110-6540, all from Agilent, Santa Clara, CA.

Pump and Autosampler: Waters 2695 HPLC system (Waters Corporation, Milford, MA).

Detector: Waters 2414 Differential Refractive Index (Waters Corporation, Milford, MA).

Eluent: tetrahydrofuran (uninhibited, HPLC grade, submicron filtered, Fisher Scientific, Waltham, MA).

Flow: 1 mL/min, Temperature: 40° C.

Injection: 100 µL.

Concentration: About 0.5% (w/v).

Calibration: PEG-10 polyethylene glycol standards (Agilent, Agilent, Santa Clara, CA Part number PL2070-0100).

Data system: Cirrus 3.2 (from Agilent, Santa Clara, CA).

Cloud Point Measurements in Super Critical Carbon Dioxide

Cloud point measurements in super critical carbon dioxide were performed with a Temco Pendant drop Interfacial Tension IFT-820-P instrument (Temco, Inc. Tulsa OK), which was modified so that the IFT cell can provide measurements of nonionic surfactant solubility in supercritical carbon dioxide (carbon dioxide held at or above its critical temperature and critical pressure) at high pressures (up to 5000 psi) and temperatures (up to 176° C.). The re-engineered cell is referred to herein as a Pressure-Volume-Temperature (PVT) cell. The PVT cell consists of a small pressure vessel (42 mL volume), two heater bands, insulating jackets, and two high-pressure, tempered borosilicate glass windows to facilitate viewing the interior of the cell. A diffuse light source was placed on one window to illuminate the interior of the cell, and a Ramé-Hart video microscope was used on the other window to take pictures of cell interior.

Since the PVT cell has a fixed volume, an accumulator was placed (1 liter in volume) in line to the system to vary the pressure inside the PVT cell by pumping fluid to or from the accumulator in to the PVT cell. The accumulator was manufactured at OFI Testing Equipment, Inc. (Houston, Tex.). One side of the accumulator was connected to the PVT cell and was designed to hold liquid carbon dioxide, the other side was plumbed up to DI water. A floating piston separates the two sides. The accumulator was housed inside a Blue M oven, model # DC-256-B-ST350 (Thermal Product Solutions), so the entire accumulator could be heated to the same temperature as the PVT cell. The tubing running from the accumulator to the PVT cell was insulated to prevent heat loss. A Haskel MS-71 air driven liquid pump (Pneumatic and Hydraulic Co., Houston, Tex.) was used to adjust the pressure of the water side of the accumulator, thereby adjusting the pressure inside the PVT cell. A Tescom 6000 psi back pressure regulator (Emerson Process Management) was installed on the water line to regulate the pressure of the water side of the accumulator, and also to function as a relief valve safety device to prevent over-pressurization of the system. Lastly, a liquid carbon dioxide feed line was added to the PVT/accumulator tubing system, with another Haskel MS-71 air driven liquid pump to aid in pumping up the liquid carbon dioxide pressure in the system. The spring inside this MS-71 pump was removed so the pump piston would operate more slowly to avoid flashing carbon dioxide inside the pump cavity. A schematic of the PVT setup with the accumulator system is shown in FIG. 1.

The total volume of the PVT cell, accumulator and all associated tubing was estimated to be approximately 1050 milliliters (mL). The cell and tubing volume was estimated to be about 50 mL, while the accumulator volume was measured to be 1000 mL. For cloud point measurements, the accumulator was tilled with 500 mL of liquid carbon dioxide. At 20° C. the density of liquid carbon dioxide is approximately 0.774 g/mL. Thus the total mass of carbon dioxide in the PVT cell system was calculated to about 385 grams; 29.3 grams in the cell, and 355.7 grams in the accumulator. Based on the total mass of carbon dioxide in the cell, the nonionic surfactant of the present disclosure was added to the system at approximately 1000 parts per million (ppm). The requisite amount of the nonionic surfactant (approximately 0.385 g) addition was performed prior to filling the cell and accumulator with carbon dioxide. Out of the 0.385 g, approximately 0.029 g was added in to the PVT cell and 0.356 g was added in to the carbon dioxide side of the accumulator. If the surfactant is solid, it was melted at 50° C. and then added in to the system. Before adding the carbon dioxide, the accumulator was pumped full of water to move the piston over to the carbon dioxide side to "zero" the volume. Surfactant was added to the tubing entering the carbon dioxide side. 500 mL of water was drained from the water side of the accumulator so as to allow 500 mL of liquid carbon dioxide to enter the carbon dioxide side and mix with the surfactant. A Haskel MS-71 carbon dioxide feed pump was used to pressurize the entire system to approximately 2300 psi before closing the carbon dioxide feed line. At this point the system was allowed to equilibrate for a few minutes to allow the surfactant to diffuse into the carbon dioxide phase, and for the carbon dioxide to permeate into all the o-rings throughout the system.

The cell and oven temperatures were set at the lowest starting test temperature (usually 40° C.) and the Haskel MS-71 water pump was used to increase the system pressure until the interior of the cell was completely clear (usually about 2500 psi). The Ramé-Hart video microscope mounted in front of one borosilicate glass cell window displays the cell interior on a computer screen. Alternately the cell interior could be viewed via a mirror through the same window. The opposite window was equipped with a light source for illuminating the cell interior for the camera.

The system was allowed to equilibrate for approximately 2 hours in this state in order to reach equilibrium at the temperature set point. After equilibration, the Tescom 6000 psi back pressure regulator was used on the water line to slowly decrease the system pressure until the surfactant began to precipitate out of solution. The pressure was recorded at which the first sign of precipitation was observed—this is referred to as the cloud point of the surfactant at the given temperature. Lower cloud point pressures indicate higher carbon dioxide solubility of the nonionic surfactant at the given test temperature.

Synthesis of Examples 1 and 2 and Comparative Examples A and B

Perform the alkoxylation reactions in a jacketed, baffled 9 liter (L) stainless steel autoclave reactor equipped with magnetically driven impeller. Prior to each feed, charge alkylene oxide to a designated feed (DF) tank positioned on a weigh cell. Transfer alkylene oxide from the DF tank to the reactor through a flow meter at the reaction temperature of 110 to 130° C.

Prepare two sets of surfactants: 2-ethyl-1-hexanol-$(PO)_5$-$(EO)_9$ (referred to herein as "EH-9") and 2-ethyl-1-hexanol-$(PO)_5$-$(EO)_{13}$ (referred to herein as "EH-13") using either a DMC catalysis (Example 1 and 2, respectively) or a KOH catalyst (Comparative Examples A and B). The specifics of the synthesis are as follows.

Comparative Examples A and B

Purge the 9 L reactor with nitrogen. Charge the 9 L reactor with 846.19 grams of 2-ethyl-1-hexanol and add 3.47 grams of potassium hydroxide pellets. Vent the reactor seven times with nitrogen to remove atmospheric oxygen. Pressurize the rector with nitrogen to 16 to 20 pounds per square inch absolute (psia) (103 to 138 KPa) at ambient temperature (approximately 23° C.). Heat the reactor contents, with agitation, to 130° C. Meter 1780 grams of propylene oxide (PO) into the reactor over several hours at 130° C. After the PO feed is complete, agitate the reactor contents at reaction temperature (130° C.) to consume unreacted oxide (digest) and then cool to 60° C.

Remove a portion of the reactor contents (144.1 g). Heat the remaining 2463.9 g of reactor contents, with agitation, to 130° C. Meter 2140 grams of ethylene oxide (EO) into the reactor over several hours. After the EO feed is complete, agitate the reactor contents at reaction temperature (130° C.) to consume unreacted oxide, and then cool to 65° C. Neutralize the reactor contents by slurrying with magnesium silicate (Magnesol®XL, 200 g) and water (10 g) and filter to give Comparative Example A, EH-9 formed with the KOH catalyst. A total of 3700 g of Comparative Example A was collected.

Comparative Example B was formed by repeating the synthesis of Comparative Example A, above, except 2157.0 grams of ethylene oxide (EO) was metered into the reactor over several hours. Neutralize the reactor contents by slurrying with magnesium silicate (Magnesol®XL, 200 g) and water (10 g) and filter to give Comparative Example B, EH-13 formed with the KOH catalyst. A total of 3700 g of Comparative Example B was collected.

The Comparative Example A (EH-9 formed with the KOH catalyst) and Comparative Example B (EH-13 formed with the KOH catalyst) were tested for carbon dioxide solubility using the PVT cell described herein (Cloud Point Measurements in Super Critical Carbon Dioxide). The cloud point pressure for each of Comparative Example A and Comparative Example B were measured at 40° C., 60° C., and 80° C. The results are shown in Table 1, below.

Examples 1 and 2

Dehydrate 500 grams of 2-ethyl-1-hexanol (2-EH) in a rotary evaporator under partial vacuum (125-250 mm Hg) with a nitrogen sweep at 110° C. for 1 hour to reduce the water level below 250 ppm. Measure the water content at 165 ppm after dehydration by Karl Fisher titration. Slurry 0.25 grams of ARCOL Catalyst 3 Double Metal Cyanide catalyst in the dehydrated 2-EH using an Ultra Turrax high speed mixer for one minute, then change into the 9 L pressure reactor, which has been nitrogen purged.

Vent the reactor seven times with nitrogen to remove atmospheric oxygen. Pressurize the rector with nitrogen to 16 to 20 psia (103 to 138 KPa) at ambient temperature (approximately 23° C.). Heat the reactor contents, with agitation, to 130° C. Meter 1120 grams of propylene oxide (PO) at 5 to 7 grams per minute into the reactor over several hours at 130° C. After the PO feed is complete, agitate the reactor contents at reaction temperature (130° C.) for an additional 2 hours to consume unreacted oxide (digest) and then cool to 60° C. A total of 123.2 grams of reaction product was drained from the reactor leaving 1497.4 grams of reaction product.

Heat the reactor contents with agitation to 130° C., and meter 1435 grams of ethylene oxide (EO) into the reactor at 5 to 7 grams/minute. After the EO feed is complete, agitate the reactor contents at reaction temperature (130° C.) for an additional 2 hours to consume unreacted oxide (digest), and then cool to 65° C. A total of 2653.10 g of Example 1 was collected.

Example 2 was formed by repeating the synthesis of Example 1, above, except 2238 grams of ethylene oxide (EO) was metered into the reactor at 5 to 7 grams/minute. A total of 3544 g of Example 2 was collected.

Example 1 (EH-9 formed with the DMC catalyst) and Example 2 (EH-13 formed with the DMC catalyst) were analyzed for solubility in supercritical carbon dioxide as discussed above (Cloud Point Measurements in Super Critical Carbon Dioxide). The cloud point pressure for each of Example 1 and Example 2 were measured at 40° C., 60° C., and 80° C. The results are shown in Table 1, below.

TABLE 1

| Surfactant | Cloud pt at 40° C. (psi) | Cloud pt at 60° C. (psi) | Cloud pt at 80° C. (psi) |
|---|---|---|---|
| Example 1 | 1910 | 2675 | 3435 |
| Example 2 | 1955 | 2880 | 3620 |
| Comparative Example A | 2400 | 3410 | 4150 |
| Comparative Example B | 2120 | 3180 | 3920 |

Table 2, below, shows the number average molecular weight (Mn (g/mol)) and the weight average molecular weight (Mw (g/mol)), determined by the SEC, and the polydispersity of Examples 1 and 2 and Comparative Examples A and B.

TABLE 2

| Surfactant | Mn (g/mol) | Mw (g/mol) | Mw/Mn (polysidpersity) |
|---|---|---|---|
| Example 1 | 801 | 855 | 1.067 |
| Example 2 | 1036 | 1087 | 1.049 |
| Comparative Example A | 786 | 954 | 1.214 |
| Comparative Example B | 1046 | 1166 | 1.115 |

Cloud Point Pressures

Figure 2:
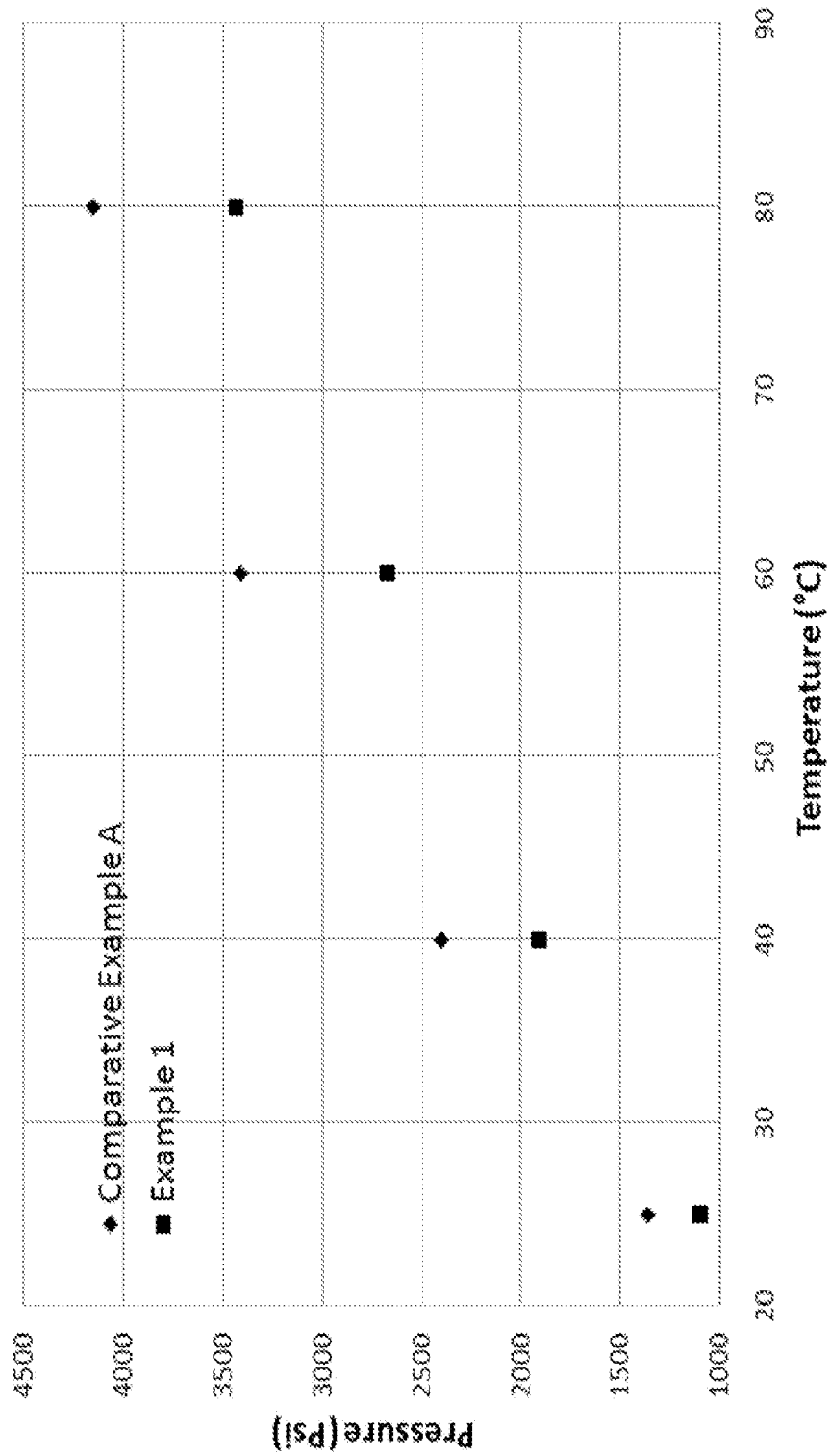
FIG. 2 provides cloud point pressures for Example 1 and Comparative Example A of the nonionic surfactant of the present disclosure.
Figure 3:
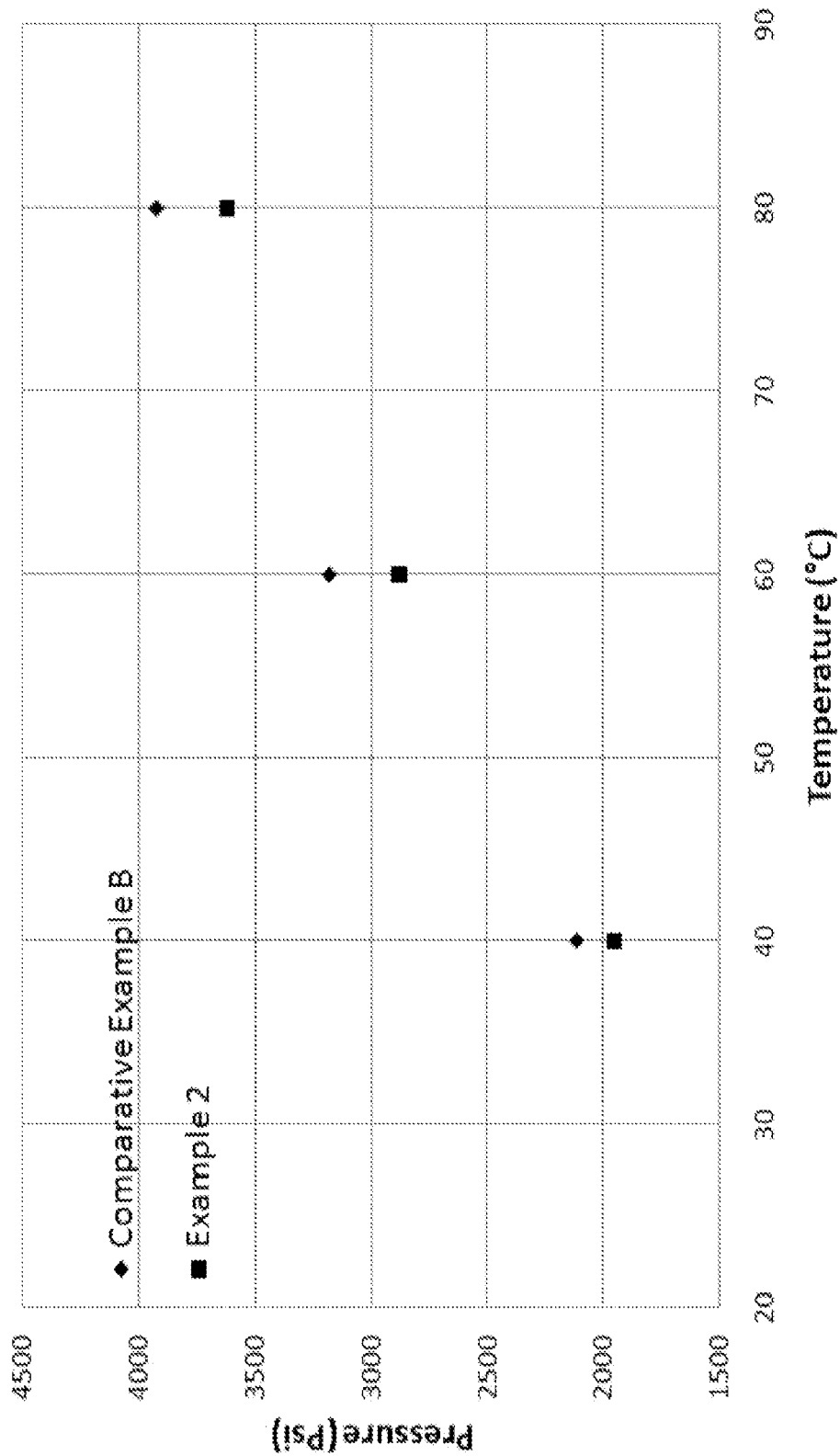
FIG. 3 provides cloud point pressures for Example 2 and Comparative Example B of the nonionic surfactant of the present disclosure.

FIGS. 2 and 3 show the cloud point pressures of Examples 1 and 2 and Comparative Examples A and B in the supercritical carbon dioxide. As illustrated in FIGS. 2 and 3, the cloud points show the solubility of the Example 1 (EH-9 formed with the DMC catalyst) and Comparative Example A (EH-9 formed with the KOH catalyst), in FIG. 2, and Example 2 (EH-13 formed with the DMC catalyst) and Comparative Example B (EH-13 formed with the KOH catalyst) in supercritical carbon dioxide, in FIG. 3, where above the cloud point pressure for a given temperature the nonionic surfactant is soluble in the supercritical carbon dioxide, whereas at or below the cloud point temperature the nonionic surfactant is insoluble in the supercritical carbon dioxide. As illustrated, the lower the pressure the more soluble the surfactant is in carbon dioxide. FIGS. 2 and 3 illustrates that the DMC catalyzed alkoxylate surfactant improves carbon dioxide solubility relative the KOH catalyzed alkoxylate surfactant.

Formation Response Testing

For formation response testing, as utilized for oil recovery methods, use a Model 6100 Formation Response Tester (FRT) (Chandler Engineering). The FRT measures the permeability changes of a formation sample when exposed to a test fluid. The FRT simulates well completion and stimulation schedule on a core sample.

For the formation response testing use a single core holder containing a single core (1.5" inch diameter and 12" long, Buff Berea sandstone, 150-250 millidarcy air permeability, available from Kocurek Industries). Wrap the core in Saran™ wrap, then aluminum foil, and then placed inside a respective Aflas® 90 rubber sleeve which was then inserted into the Hassler-type core holder. Apply a confining pressure of 3000 pounds per square inch (psi) and a pressure of 1500 psi at the outlet of the core in the backpressure regulator. Heat the core to the desired temperature before injecting fluids. Preheat the fluids to the core temperature prior to injection to minimize heating and cooling effects in the core. Use a differential pressure transducer to measure pressure drop across core up to 50 psi. Measure pressure drops exceeding 50 psi across the core as a difference between the cell inlet and cell outlet pressure transducers.

For each of Example 2 and Comparative Example B, saturate the core with the surfactant by injecting about 25 ml of a 1 weight percent (wt. %) solution of the surfactant in brine (3% NaCl). Co-inject the brine, including 1 wt. % surfactant (flow rate: 0.1 milliliters/minute), and $CO_2$ (flow rate: 0.9 milliliters/minute) into the core to form the emulsion. Perform the experiments at room temperature (23° C.). Monitor the pressure drop across the core for 26 hours.

Figure 4:
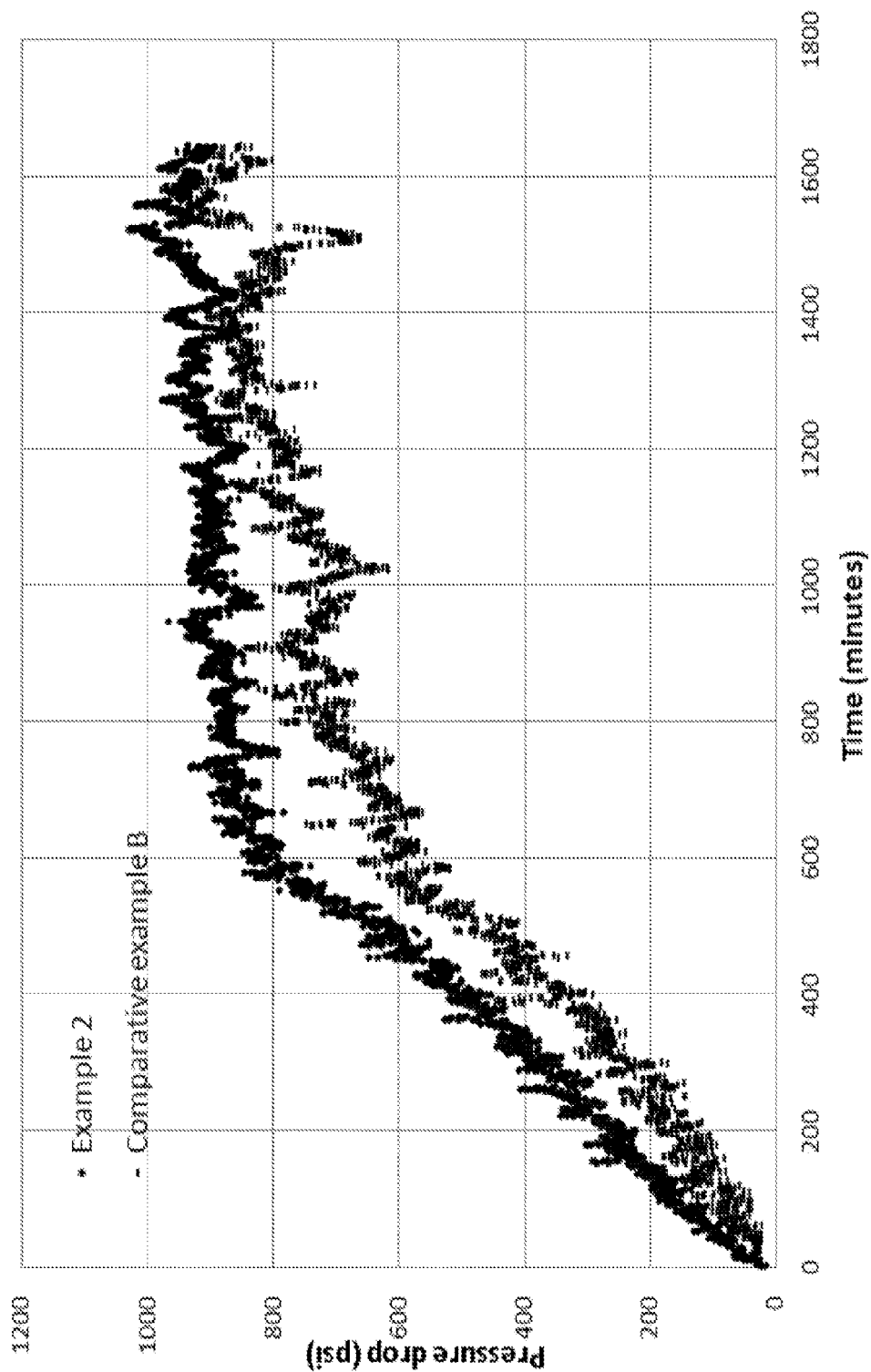
FIG. 4 provides a pressure drop versus time diagram for the Comparative Example B and the nonionic surfactant of Example 2 of the present disclosure.

FIG. 4 illustrates pressure drop versus time diagram for the surfactant of Comparative Example B and the nonionic surfactant of Example 2. The increase in pressure drop over time for both surfactants indicates formation of emulsion in the core. The pressure drops are similar for both surfactants indicating that similar foam strength is obtained while using either DMC or KOH catalyzed surfactants.

In the foregoing Detailed Description, various features are grouped together in exemplary embodiments for the purpose of streamlining the disclosure. This method of disclosure is not to be interpreted as reflecting an intention that any claim requires more features than are expressly recited in the claim. Rather, as the claims reflect, inventive subject matter lies in less than all features of a single disclosed embodiment. Thus, the claims are hereby incorporated into the Detailed Description, with each claim standing on its own as a separate embodiment of the disclosure.

What is claimed is:

1. An emulsion, comprising:
   carbon dioxide;
   a diluent; and
   a nonionic surfactant prepared by an alkoxylation reaction with a double metal cyanide catalyst, where in a first stage of the alkoxylation reaction a first epoxide selected from the group consisting of propylene oxide, butylene oxide, hexane oxide, octane oxide and combinations thereof reacts with a branched aliphatic alcohol having up to 9 carbon atoms to form an intermediate compound that reacts in a second stage of the alkoxylation reaction with a second epoxide different than the first epoxide, the second epoxide selected from the group consisting of ethylene oxide, propylene oxide, butylene oxide, hexane oxide, octane oxide and combinations thereof where the nonionic surfactant has a polydispersity of 1.01 to 1.10.

2. The emulsion of claim 1, where the branched aliphatic alcohol has 6 to 8 carbon atoms.

3. The emulsion of claim 1, where the first epoxide is propylene oxide and the second epoxide is ethylene oxide, and the first stage of the alkoxylation reaction adds the propylene oxide to the branched aliphatic alcohol and the second stage of the alkoxylation reaction adds the ethylene oxide to provide the nonionic surfactant.

4. The emulsion of claim 1, where the first epoxide is propylene oxide and the alkoxylation reaction has a molar ratio in a range of 1.5 to 10 moles of propylene oxide per mole of branched aliphatic alcohol.

5. The emulsion of claim 1, where the second epoxide is ethylene oxide and the alkoxylation reaction has a molar ratio in a range of 1.5 to 40 moles of ethylene oxide per mole of branched aliphatic alcohol.

* * * * *